United States Patent
Frydman et al.

(10) Patent No.: US 11,050,670 B2
(45) Date of Patent: Jun. 29, 2021

(54) METHODS CIRCUITS DEVICES SYSTEMS AND ASSOCIATED MACHINE EXECUTABLE INSTRUCTIONS FOR TRANSPORTING PACKETIZED DATA ACROSS A CELLULAR COMMUNICATIONS NETWORK

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD, Yokneam Illit (IL)

( * ) Notice: Subject to any disclaimer, the term of this patent is extended or adjusted under 35 U.S.C. 154(b) by 0 days.

(21) Appl. No.: 16/508,368

(22) Filed: Jul. 11, 2019

(65) Prior Publication Data

US 2020/0162390 A1 May 21, 2020

Related U.S. Application Data (63) Continuation of application No. 15/184,078, filed on Jun. 16, 2016, now abandoned.

(60) Provisional application No. 62/180,067, filed on Jun. 16, 2015, provisional application No. 62/198,728, filed on Jul. 30, 2015.

(51) Int. Cl.
*H04L 12/815* (2013.01)
*H04L 29/06* (2006.01)
*H04L 12/851* (2013.01)
*H04L 12/841* (2013.01)
*H04M 7/12* (2006.01)

(52) U.S. Cl.
CPC .......... *H04L 47/22* (2013.01); *H04L 47/2483* (2013.01); *H04L 47/283* (2013.01); *H04L 65/1026* (2013.01); *H04L 65/1069* (2013.01); *H04L 65/80* (2013.01); *H04M 7/123* (2013.01); *H04L 63/30* (2013.01)

(58) Field of Classification Search
CPC . H04L 47/22; H04L 65/1069; H04L 65/1026; H04L 65/80; H04L 47/2483; H04L 47/283; H04L 63/30; H04M 7/123
See application file for complete search history.

(56) References Cited

U.S. PATENT DOCUMENTS

| | | | | |
|---|---|---|---|---|
| 5,802,320 A | * | 9/1998 | Baehr | H04L 63/0236 340/2.2 |
| 8,356,089 B1 | * | 1/2013 | Quilter | H04L 63/029 709/222 |
| 8,612,612 B1 | * | 12/2013 | Dukes | H04L 67/141 709/228 |

(Continued)

*Primary Examiner* — Tejis Daya
(74) *Attorney, Agent, or Firm* — Vladimir Sherman; Professional Patent Solutions LT (57) ABSTRACT

Disclosed is a communication network having at least one network access segment including one or more network access points, wherein a selective packet bridge appliance integral or otherwise functionally associated with the at least one network access segment, is adapted to selectively shunt packet flow between two or more mobile communication devices communicatively coupled to the at least one network access segment through access points of the at least one network segment, and wherein a packet is selected for shunting at least partially based on an intended destination of the packet and at least partially based on a payload type of the packets.

13 Claims, 8 Drawing Sheets

(56) References Cited

U.S. PATENT DOCUMENTS

| | | | | |
|---|---|---|---|---|
| 9,038,151 B1* | 5/2015 | Chua | H04L 63/02 | 726/6 |
| 9,113,400 B2* | 8/2015 | Varma | H04W 48/16 | |
| 9,716,739 B2* | 7/2017 | Krishna | H04L 41/5035 | |
| 9,723,638 B2* | 8/2017 | Qin | H04W 48/20 | |
| 9,755,788 B2* | 9/2017 | Pollack | H04L 1/1874 | |
| 9,781,655 B2* | 10/2017 | Lee | H04L 65/608 | |
| 9,877,139 B2* | 1/2018 | Venkatachalam | H04W 4/70 | |
| 2003/0012144 A1* | 1/2003 | Nichols | H04L 49/9057 | 370/252 |
| 2006/0129646 A1* | 6/2006 | Rhee | H04L 65/1016 | 709/206 |
| 2008/0233957 A1* | 9/2008 | Akama | H04L 67/1095 | 455/435.1 |
| 2009/0172171 A1* | 7/2009 | Amir | H04L 63/0428 | 709/227 |
| 2010/0115307 A1* | 5/2010 | Diab | G06F 1/3234 | 713/320 |
| 2010/0202397 A1* | 8/2010 | Chari | H04L 47/2408 | 370/329 |
| 2010/0205311 A1* | 8/2010 | Olrog | H04L 65/1069 | 709/228 |
| 2011/0141947 A1* | 6/2011 | Li | H04L 65/103 | 370/259 |
| 2014/0003430 A1* | 1/2014 | Arberg | H04L 41/0654 | 370/390 |
| 2014/0010167 A1* | 1/2014 | Hodges | H04W 76/10 | 370/329 |
| 2014/0053264 A1* | 2/2014 | Dubrovsky | H04L 63/1416 | 726/22 |
| 2014/0155043 A1* | 6/2014 | Gell | H04L 67/02 | 455/414.1 |
| 2014/0233385 A1* | 8/2014 | Beliveau | H04L 47/122 | 370/235 |
| 2014/0233400 A1* | 8/2014 | Cai | H04W 4/24 | 370/250 |
| 2014/0369198 A1* | 12/2014 | Rinne | H04L 45/245 | 370/235 |
| 2015/0138987 A1* | 5/2015 | Lee | H04L 45/12 | 370/238 |
| 2015/0146723 A1* | 5/2015 | Zakrzewski | H04L 65/102 | 370/392 |
| 2015/0181467 A1* | 6/2015 | Bindrim | H04L 45/308 | 370/235 |
| 2016/0006654 A1* | 1/2016 | Fernando | H04L 45/36 | 370/392 |
| 2016/0036657 A1* | 2/2016 | Ardeli | H04W 36/26 | 370/235 |
| 2016/0315785 A1* | 10/2016 | Dronadula | H04L 12/4633 | |

* cited by examiner

FIG. 1

PRIOR ART

FIG. 2

PRIOR ART

METHODS CIRCUITS DEVICES SYSTEMS AND ASSOCIATED MACHINE EXECUTABLE INSTRUCTIONS FOR TRANSPORTING PACKETIZED DATA ACROSS A CELLULAR COMMUNICATIONS NETWORK

RELATED APPLICATIONS

The present Application claims priority from U.S. Provisional Patent Application No. 62/180,067, entitled: "System and method for Routing Voice Over IP calls within a Mobile Edge Computing server", filed on Jun. 16, 2015; and from U.S. Provisional Patent Application No. 62/198,728, entitled: "System and method for Routing Voice Over IP calls within a Mobile Edge Computing server", filed on Jul. 30, 2015; both of which applications are hereby incorporated by reference into the present application in their entirety.

FIELD OF THE INVENTION

The present invention generally relates to the field of wireless communication. More specifically, the present invention relates to methods, circuits, devices, systems and associated machine executable instructions for transporting packetized data across a cellular communications network.

BACKGROUND

In recent years, Mobile Network Operators are moving into Voice over LTE [Long Term Evolution] (VoLTE) technology to further reduce operational cost of voice services over circuit switch technology. VoLTE offers great cost reduction in peer to peer calling merely by the fact that once a voice channel is established packets are routed directly between peers without the need for any mediation device as is required in Circuit Switch technology. Still, one of the major pitfalls of voice over IP is its sensitivity to delay and jitter between the end points, with shorten packet delays and improved likelihood of better voice quality for the duration of the call, remaining a main goal. In Mobile networks, however, the structure of the network and the delay over the air interface often creates a long delay path between the 2 endpoints that could reach a Round-Trip Time (RTT) of 200 msec, even between endpoints which are in close physical proximity.

Accordingly, there remains a need, in the field of wireless communication for techniques that may be utilized to detect a VOIP or VoLTE call which occurs within the same local area and then to find the preferred (e.g. best and shortest) route for the voice packets within the network, while maintaining support for handover and mobility, lawful interception and correct charging and billing information. Described techniques may be likewise applicable to other (non-VoIP) data types, and/or to other communication/data-payload types.

SUMMARY OF INVENTION

The present invention includes methods, circuits, devices, systems and associated machine executable instructions for transporting packetized data across a cellular communications network. According to some embodiments, there may be provided a selective packet bridge appliance integral or otherwise functionally associated with a cellular network access segment and adapted to shunt a packet flow between two or more mobile communication devices (Also referred to as UE (User Equipment)) utilizing the same or nearby network access segments. The selective packet bridge appliance may selectively bridge packet flow between two mobile communication devices upon packet inspection identifying that the two mobile communication devices are communicatively coupled to the same or to interconnected network access segment(s). A second condition for triggering packet flow shunting or bridging by the selective packet bridge appliance may be detection of specific packet payload types, for example, speech, video and/or any other payload type benefiting from shortened transport times and/or improved transport quality.

According to embodiments, the selective packet bridge may include a packet inspector, packing bridging logic, and a packet injector. The packet inspector may be in the form of a dedicated digital logic circuit or in the form of machine executable code running on a processor, a digital signal processor (DSP), a field programmable array (FPGA) or any other configurable digital processing apparatus or platform. The packet inspector may be communicatively coupled to one or more upstream data lines/channels of the network access segment with which the packet bridge is integral or otherwise functionally associated. The upstream lines/channels carry data packets generated and transmitted by communication devices communicatively coupled to an access point of the network access segment with which the packet bridge is integral or otherwise functionally associated. The packet inspector may be adapted to determine packet parameters including one or more of: (a) a payload type; (b) a packet source designator, (c) a packet destination designator, and (d) a quality of service requirement. The packet inspector may also be adapted to copy and/or remove packets from upstream line/channel. According to embodiments of the present invention, when the upstream lines/channels are within a flat IP tunnel, the packet inspector may include or be otherwise functionally associated with IP tunnel de-encapsulation and/or encapsulation circuitry.

The packet injector may be in the form of a dedicated digital logic circuit or in the form of machine executable code running on a processor, a digital signal processor (DSP), a field programmable array (FPGA) or any other configurable digital processing apparatus or platform. The packet injector may be communicatively coupled to one or more downstream data lines/channels of the network access segment with which the packet bridge is integral or otherwise functionally associated. The downstream lines/channels carry data packets designated for communication devices communicatively coupled to an access point of the network access segment with which the packet bridge is integral or otherwise functionally associated. The packet injector may be adapted to inject or append data packets into a packet flow passing through a functionally associated downstream line/channel. For example, the packet injector may be adapted to inject or append an identical or modified copy of a packet copied or removed from an upstream line/channel by a functionally associated packet inspector. According to some embodiments, the packet injector may also include packet inspection functionality, such as inspection of parameters including one or more of: (a) a packet payload type; (b) a packet source designator, (c) a packet destination designator, and (d) a quality of service requirement. According to embodiments of the present invention, when the downstream line/channel is within a flat IP tunnel, the packet injector may include or be otherwise functionally associated with IP tunnel de-encapsulation and encapsulation circuitry.

A packet bridging logic, integral or otherwise functionally associated with a selective packet bridging appliance according to embodiments, may be in the form of a dedicated digital logic circuit or in the form of machine executable code running on a processor, a digital signal processor (DSP), a field programmable array (FPGA) or any other configurable digital processing apparatus or platform. The bridging logic may select which packets to shunt or bridge from an uplink or upstream line/channel of a network access segment associated with (e.g. serviced by) the selective packet bridging appliance to a downlink or downstream line/channel of the same or another network access segment associated with the selective packet bridging appliance. A first criteria or parameter the bridging logic circuits, according to embodiments, may use to determine whether to shunt/bridge a packet from an upstream line/channel to a downstream line/channel is a destination of the packet. If, for example, the packet's destination designator (e.g. destination IP address, a cellular network address, etc.) is not associated with a communication device communicatively coupled to the network access segment serviced by the selective packet bridging appliance, than bridging the packet to a downstream line/channel of that network segment would serve no purpose. Therefore, the first criteria for deciding to shunt/bridge a packet according to embodiments may be that the packet's destination be a communication device communicatively coupled to a network access segment serviced by or otherwise connected to the selective packet bridge.

Determining whether an upstream packet is intended for a communication device connected to the same of related network access segment may be achieved according to one of several techniques. According to one technique, the packet selection logic may compare a destination designator (e.g. Packet Destination IP address) on a packet with network reference table which includes records correlating connected device IP addresses with specific network access segments. According to further embodiments, the packet selection logic may detect corresponding packet flows on the uplink line and the downlink line connected to the selective packet bridging appliance. Detection of a correlation between an uplink packet stream and a downlink packet stream may indicate corresponding packet flows between two communication devices communicating with one another.

Even after the packet selection logic determiners that a specific packet or packet flow is intended for a communication device communicatively coupled to a serviced network access segment, the selection logic circuits may also check packet types and/or packet payload types before making a selection to shunt/bridge. The selection logic may choose to shunt Real-time Transport Protocol (RTP) packets, such as Voice-over-IP packets and or like video feed packets while ignoring non-RTP type packets.

A second criteria or parameter factored by bridging logic according to embodiments when selecting packets for shunting/bridging is a payload type (e.g. content type) of packets. User experience for certain packet payloads or payload types, such as live voice data and/or live video feed data, is affected by packed delivery delays and thus enhanced by shunting or bridging of the packets between the source and destination. While user experience for other types of payload, such as email or file transfers, are less affected by packet delivery delays, and thus benefit less from packet shunting/bridging. Accordingly, a second criteria used to determine whether to shunt packet flow between two communication devices, each of which is communicatively coupled to the same or associated network access segments serviced by the selective packet bridge, is the type of payload the packet flow is carrying and more specifically that payload's sensitivity to delivery delays. According to embodiments of the present invention, packet bridging logic may select packets carrying Voice over IP data and/or Video over IP data.

According to further embodiments of the present invention, either the packets or copies of packets being shunted may also be forwarded towards a core of the communication network. The copies of the shunted packets may be forwarded to the network core for billing and/or legal inspection purposes. A packet-router/core-router at or near the network core may forward the packet copies back towards their designated destination devices, towards the network access segments service by selective packet bridge. According to yet further embodiments, the shunted packets or packet copies sent back to the network access segments from the network core may be terminated or dropped by the selective packet bridge of by a functionally associated network appliance prior to the packets or packet copies reaching their designated destination. According to further embodiments, upon a selective packet bridge or bridging appliance detecting that a destination communication device of a packet flow being shunted by the bridge has disconnected from a network access segment serviced by or otherwise functionally associated with the bridge (e.g. handover to another access segment occurred), the bridge may cease shunting the packet flow and may allow the packet router at the network core to forward the packets to the new network access segment.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

The present invention includes methods, circuits, devices, systems and associated machine executable instructions for transporting packetized data across a cellular communications network. According to some embodiments, there may be provided a selective packet bridge appliance integral or otherwise functionally associated with a cellular network access segment and adapted to shunt packet flow between two or more mobile communication devices utilizing the same or nearby network access segments. The packet bridge appliance may selectively bridge packet flow between two appliances upon packet inspection identifying that the two mobile communication devices are communicatively coupled to the same or interconnected network access segments. A second condition for packet flow bridging to be triggered by the packet bridge appliance may be detection of specific packet payload type, for example, speech, video and/or any other payload type benefiting from shortened transport times.

According to further embodiments, the packet bridge appliance covering one or more network segments, or another functionally associated network appliance, may inspect packets flowing towards the network core and packets flowing from the network core in order identify a packet flow, such as VoIP packet flows, which is both originating and terminating within a network segment being covered by the packet bridging appliance. Identification of such a packet flow may trigger bridging of the packet flow, as described above. Detection of such a packet flow, for example using packet inspection, may also trigger detection and bridging of a corresponding packet flow in an opposite direction.

According to further embodiments, a copy of packets originating at one or more of the mobile communication devices whose packet flows are being bridged may be transmitted along an original path towards a core of the cellular communication network.

The present invention discloses a method to detect a VOIP or VoLTE call which occurs within the same local area and then find the best the shortest route for the voice packets within the network while keeping smooth handover and mobility, lawful interception and correct charging and billing information. The disclosed System and Method illustrates a way in which VOIP or VoLTE RTP packets can be locally routed either within the same Mobile Edge Computing (MEC) servers or between MEC servers for best possible shortest route to achieve minimum delay path and thus guarantee best possible voice quality. Furthermore there may be provided a method by which to maintain handovers and mobility function as well as lawful interception and charging.

Figure 1:
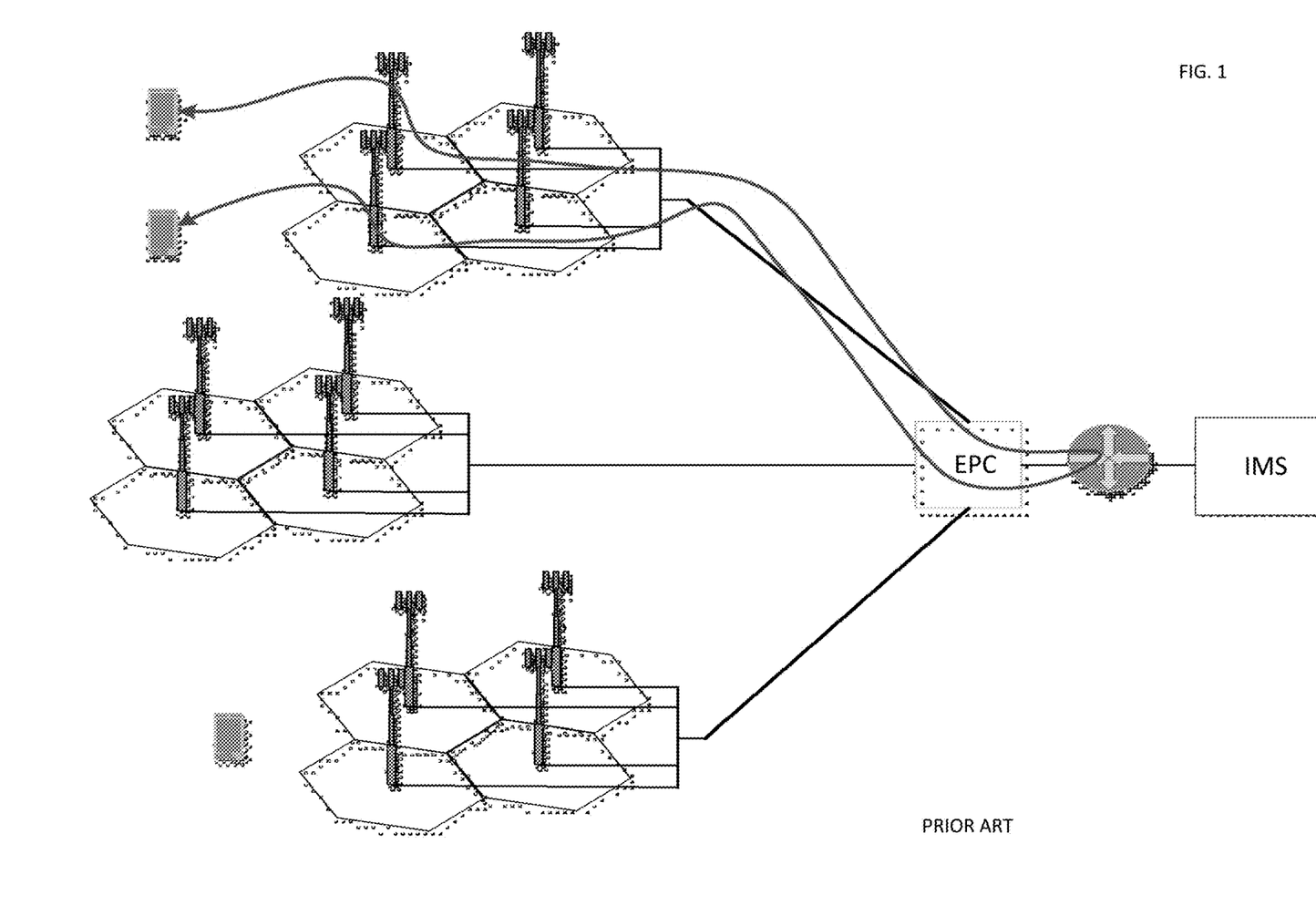
FIG. 1 shows a simplified cellular network diagram according to the prior art wherein VoIP data packets between two mobile communication devices, also referred to as user equipment, connected to the same network access segment are routed through a packet switch at the network core.

Turning now to FIG. 1 there is shown a simplified cellular network diagram according to the prior art wherein VoIP data packets between two mobile communication devices, also referred to as user equipment (UE), connected to the same network access segment are routed through a packet switch at the network core. The Real-time Transport Protocol (RTP) packets (red line) are shown, in accordance with some embodiments, to be travelling all the way up from the 1st UE towards the Evolved Packet Core (EPC—a framework for providing converged voice and data on a 4G Long-Term Evolution (LTE) network) only to be routed back to a different UE in close proximity to the calling UE.

With the introduction of an MEC server (not shown) into the network the Session Initiation Protocol (SIP) signaling may be analyzed by the MEC server (in case the Gm interface [An Interface Name—Used to exchange messages between SIP user equipment (UE) or VoIP gateway and P-CSCF] between the UE and the P-CSCF [A Proxy-CSCF—An SIP proxy that is the first point of contact for the IMS terminal] is not encrypted) and determine that the call that is currently being setup is actually a local call within the same MEC server.

In the case that the Gm Interface is encrypted, the MEC server may listen on RTP ports and detect RTP flows that are going in opposite directions between (from/to) the same IP Addresses. Correlation of the RTP packets while assuring one to one relationship may provide high guarantee (e.g. 100%) of detection of a voice call. Detection may, for example, take few milliseconds and as such the first few RTP packets may be routed through the EPC and only later packets will be routed locally. Detection may be done based on the user space IP address and RTP ports.

Figure 2:
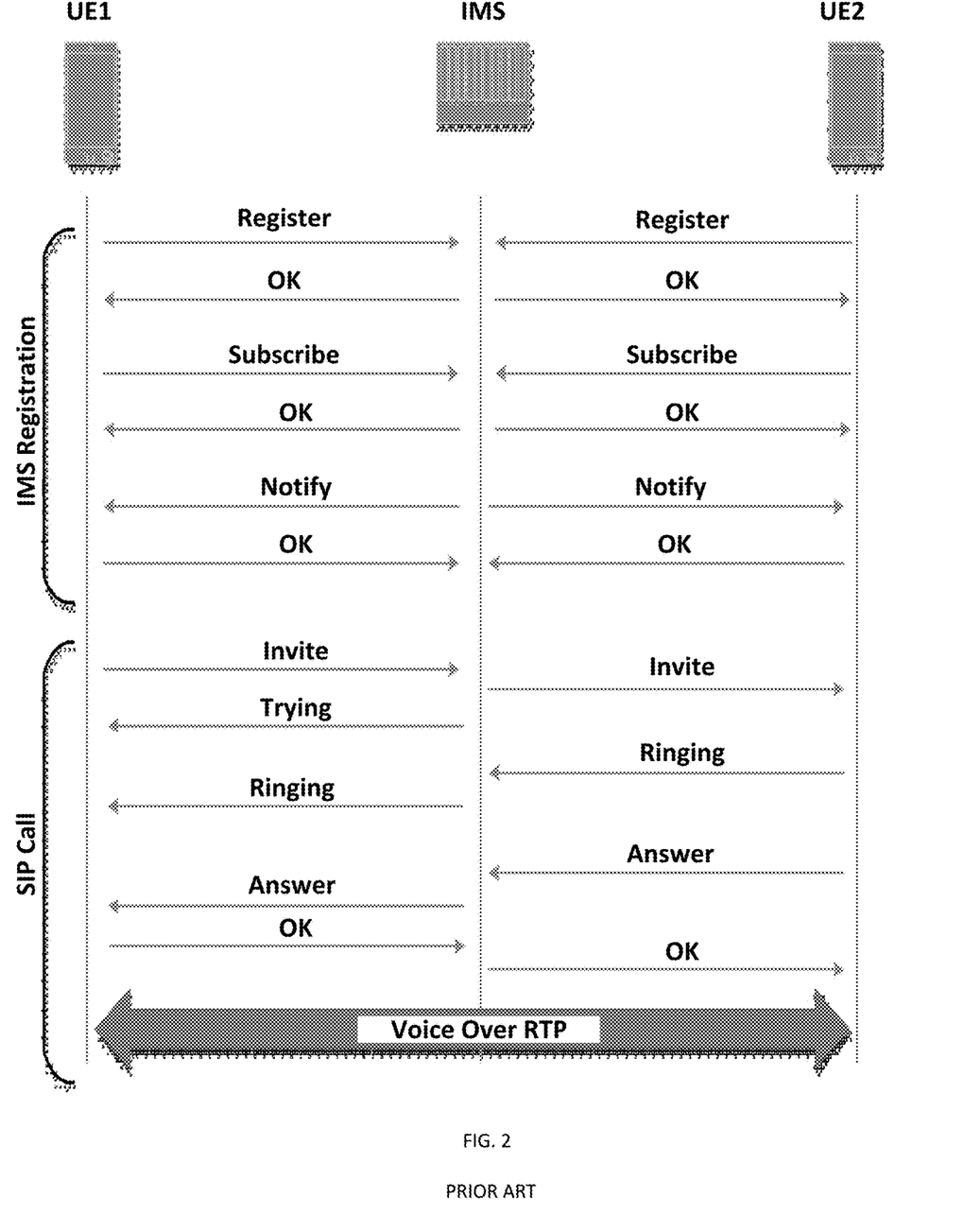
FIG. 2 is signaling/packet flow diagram of a VoIP call setup process according to the prior art.

Turning now to FIG. 2, there is shown a signaling/packet flow diagram of a VoIP call setup process according to the prior art. In the figure there is shown, in accordance with some embodiments, a User Equipment (UE) registration with the IP Multimedia Core Network Subsystem (IMS) core over SIP and then a call setup between two UEs. Messages happening between other mobile network elements to setup required bearers (e.g. for VoLTE signaling and voice traffic) are not shown in the figure. Once the RTP tunnel is formed and in case a Mobile Routing Facility (MRF) is not required (i.e. VoLTE call between to UE's) the RTP packets are routed between the UEs using the routing facility in the mobile network.

Figure 3A:
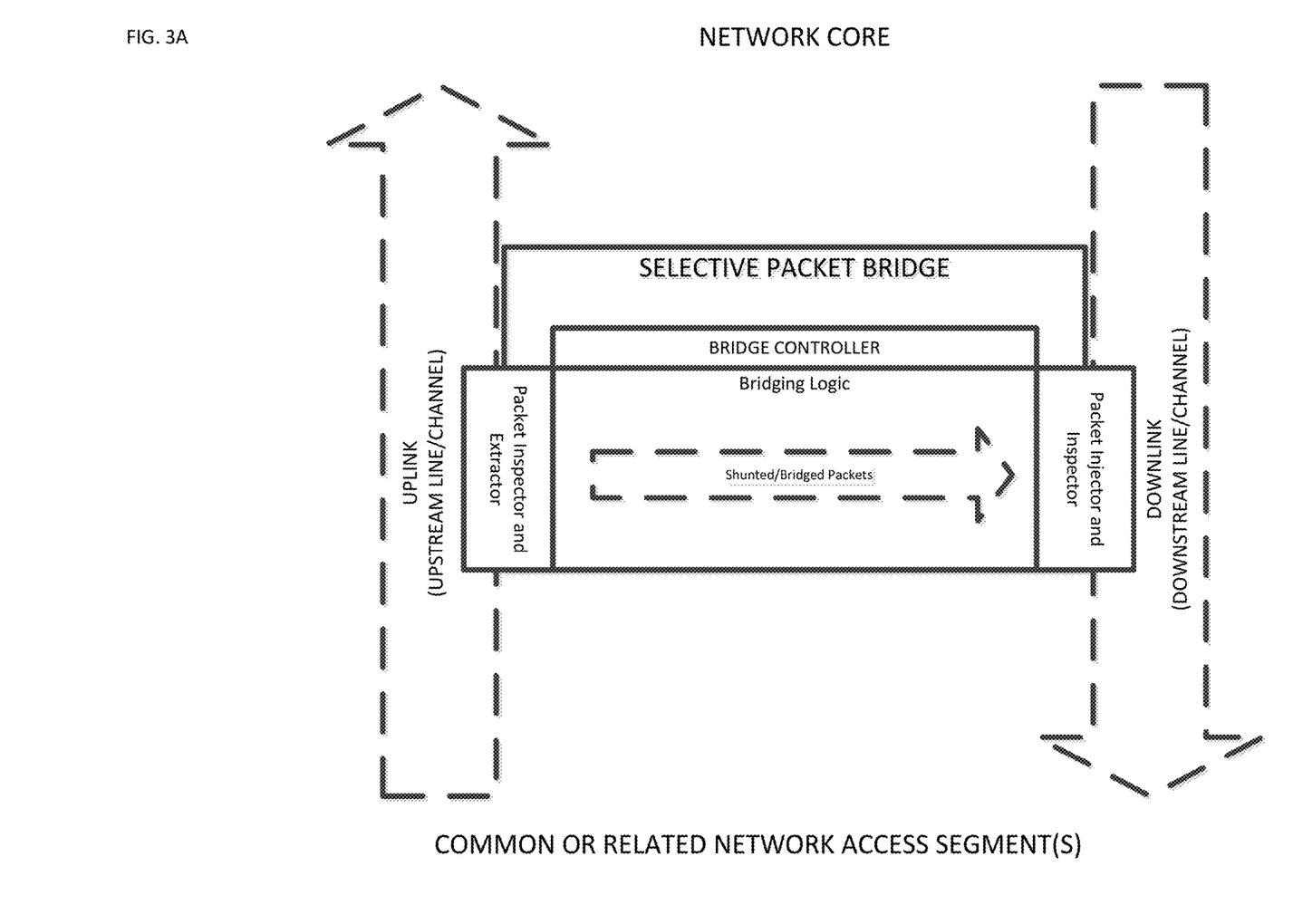
FIG. 3A is a functional block diagram of an exemplary selective packet bridging appliance (a.k.a. a bridge) according to embodiments of the present invention.

Turning now to FIG. 3A, there is shown a functional block diagram of an exemplary selective packet bridging appliance (a.k.a. a bridge) according to embodiments of the present invention. The functionality of the selective packet bridging appliance may be described in conjunction with the steps illustrated in the flowchart of FIG. 3B.

Figure 3B:
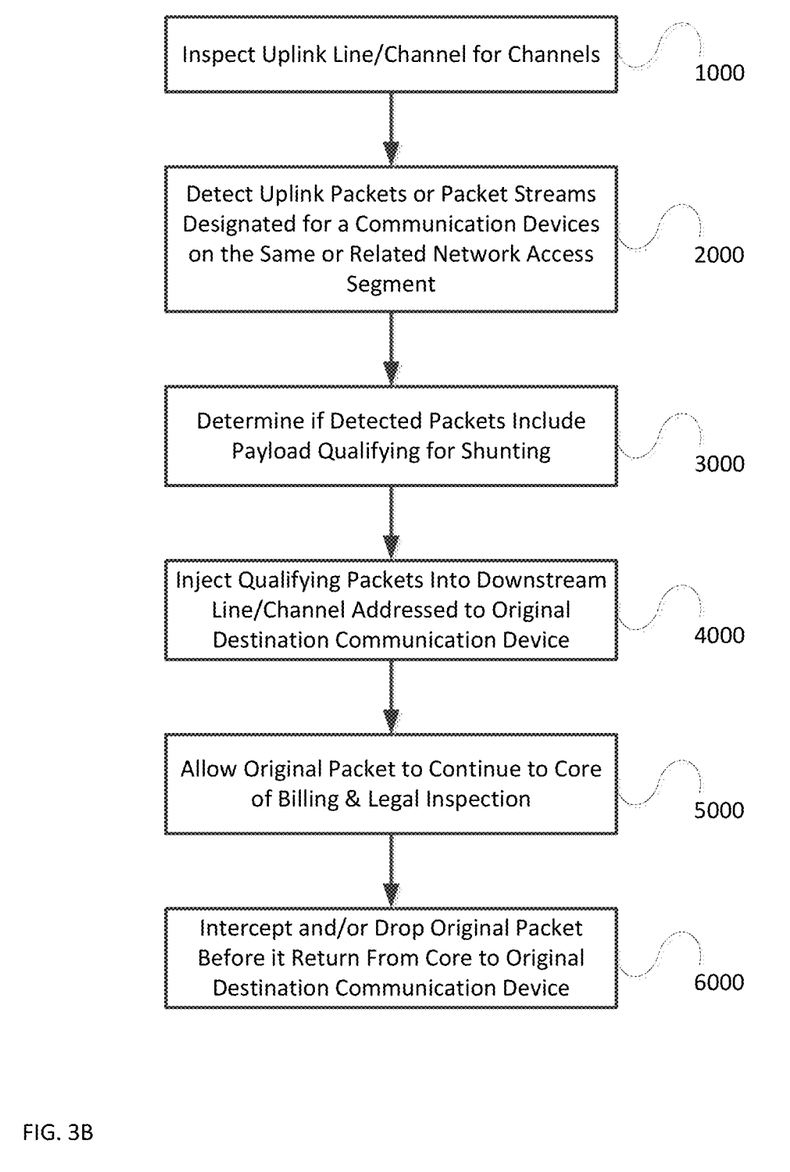
FIG. 3B is a flowchart including the steps of an exemplary packet bridging/shunting method according to embodiments of the present invention corresponding to the functionality of a selective packet bridge.

The selective packet bridging appliance shown includes a bridge controller for managing the operation of the shown packet inspectors, a packet extractor and a packet injector. The packet inspector, inspects Uplink Line/Channel (1000), Based on a comparison of one or more packets, or parts thereof, inspected on the upstream line/channel, to one or more packets, or parts thereof, inspected on the downstream line/channel. The shown bridging logic detects uplink packets or packet streams designated for a communication devices on the same or related network access segment (2000), and thus determines/estimates whether the participating communication devices are on the same or on a related network access segment. The shown bridging logic further determines if detected packets include payload qualifying for shunting (3000).

Upon a successful comparison (devices on same/related network access segment) and a positive inspection (packet payload qualifying for shunting), the injector injects qualifying packets into downstream line/channel addressed to the original destination communication device (4000). Qualifying packets (addressed to the network core) are accordingly extracted by the extractor from the upstream line/channel and injected into the downstream line/channel addressed to the original destination communication device.

Original packets are allowed to continue to the network core for billing & legal inspection purposes (5000). Before return from the network core to the original destination communication device, original packets are intercepted (6000).

Figure 4A:
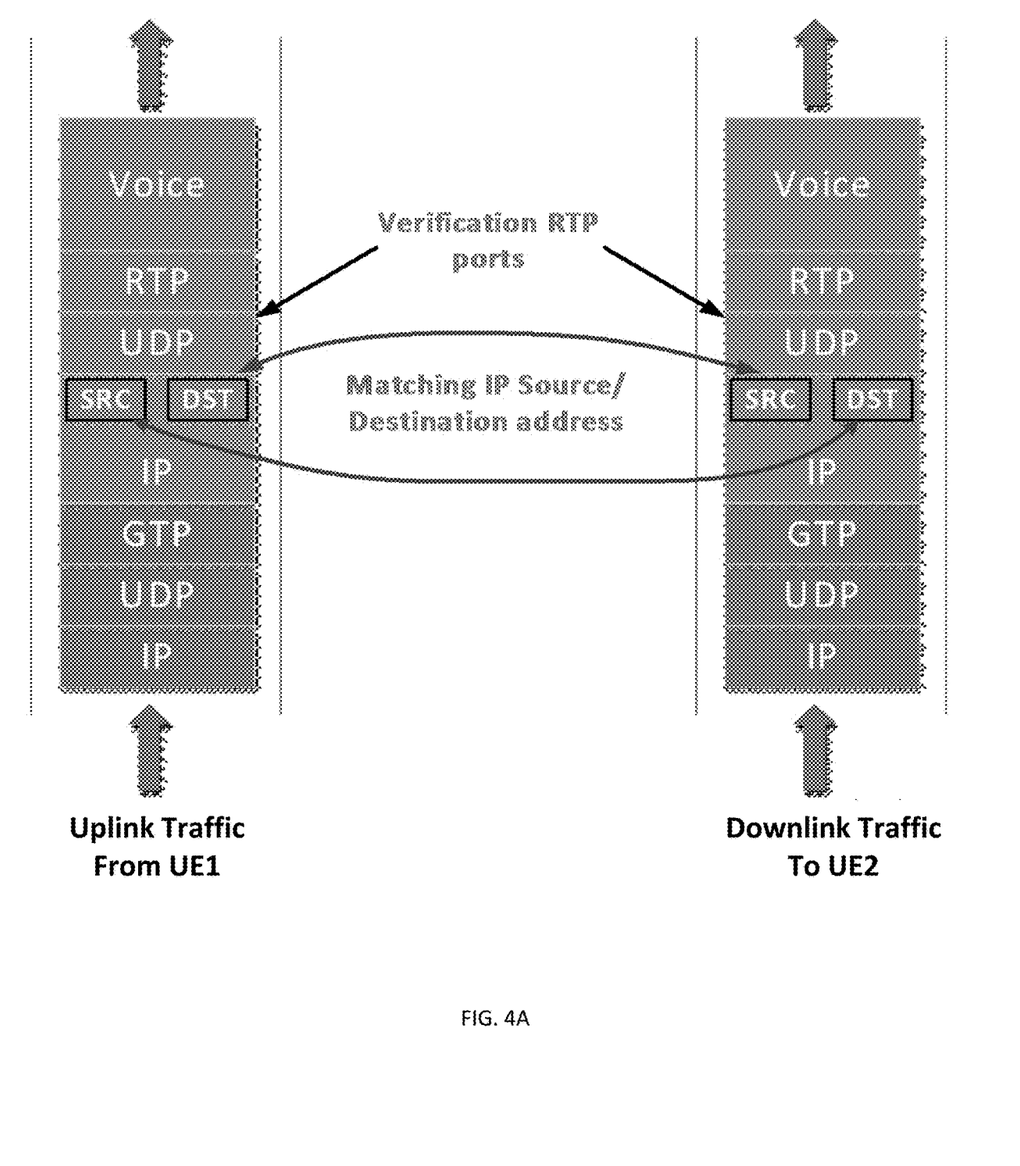
FIG. 4A illustrates packet parameters inspected and matched between upstream and downstream packets in order identify packet stream which may be shunted.

Turning now to FIG. 4A, there is shown an exemplary selective packet bridging appliance (a.k.a, a bridge) inspecting and matching packet parameters between upstream and downstream packets in order to identify packet streams which may be shunted.

The detection of correlated RTP flows within the same MEC server, in accordance with some embodiments, may include analyzing the RTP packets content and detecting identical packets and/or sequences of packets going in both directions via the MEC server, thus indicating that both endpoints of the call are being served by the same MEC server.

In the figure, the source of a given uplink traffic packet, from a first UE, is compared to the destination of a given downlink traffic packet, travelling towards a second UE; and the destination of a given uplink traffic packet, from a first UE, is compared to the source of a given downlink traffic packet, travelling towards a second UE. Matching IP source/destination addresses of packets going in both directions via the MEC server, may indicate that both endpoints of the call are being served by the same MEC server.

Figure 4B:
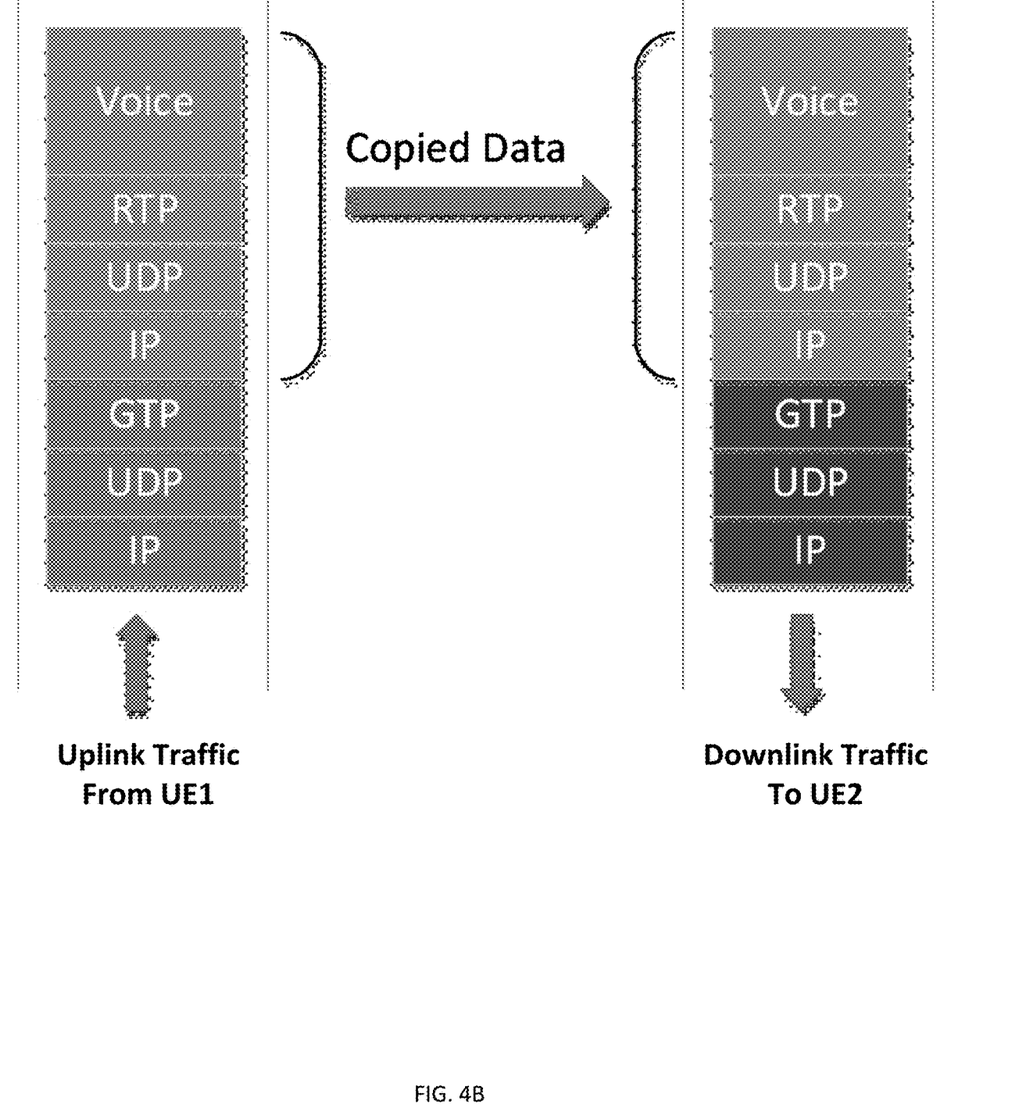
FIG. 4B illustrates packet portions copies from an uplink packet to a downlink packet as part of an exemplary selective packet shunting process according to embodiments of the present invention.

Turning now to FIG. 4B, there is shown an exemplary selective packet bridging appliance (a.k.a. a bridge) coping packet portions from an uplink packet to a downlink packet as part of an exemplary selective packet shunting process according to embodiments of the present invention.

In the figure there is shown the MEC server, upon completion of the detection of a local call, extracting the Internal IP message, including all headers above it, from its GTP tunnel that belongs to the first UE and inserts it into the GTP tunnel of the other UE. This may be done in both directions. The end result is that RTP traffic is routed locally, the resulted route of the RTP is illustrated in following FIG. 5.

Figure 5:
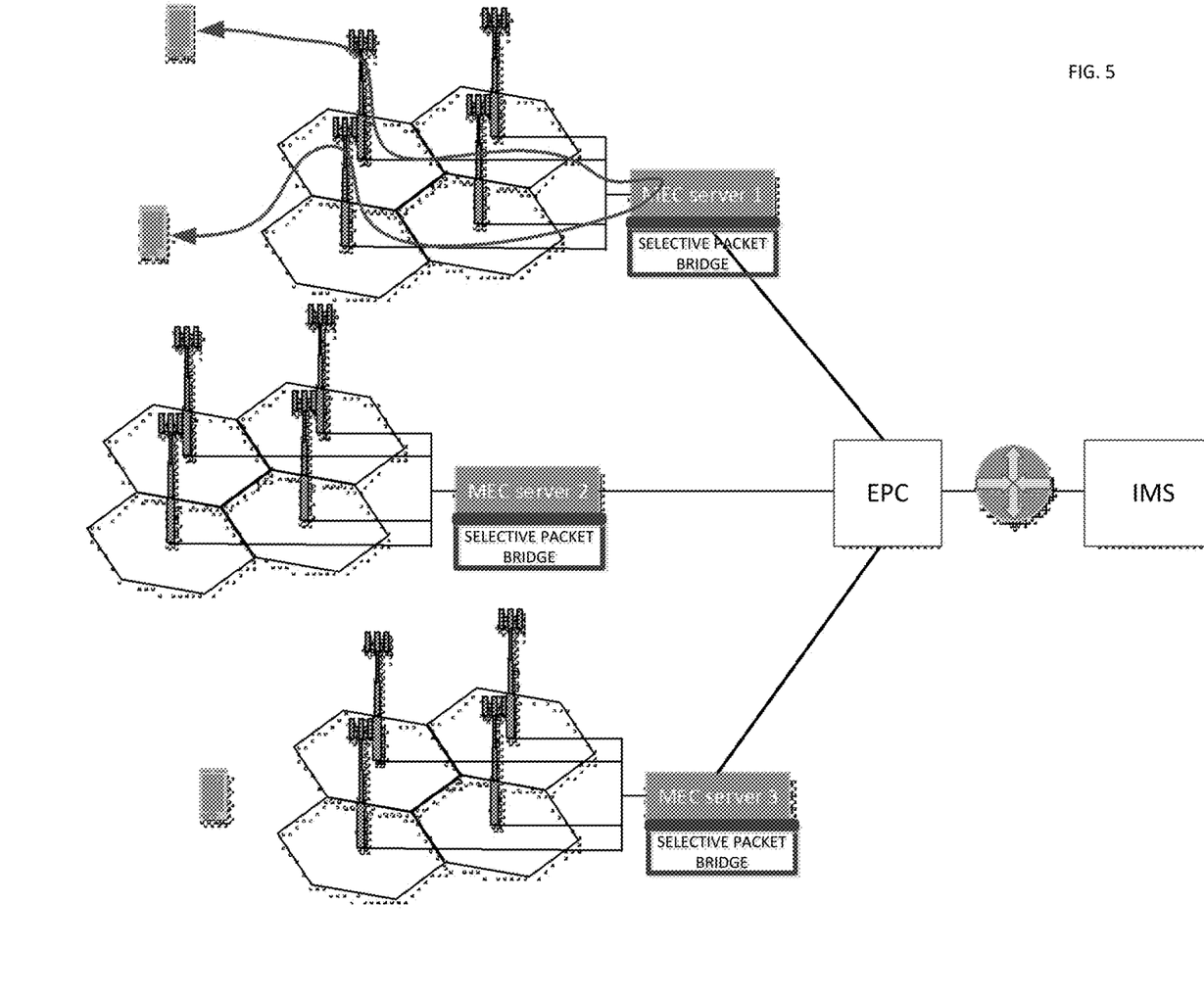
FIG. 5 is a network diagram of an exemplary cellular communication network according to embodiments including selective packet bridges integral or otherwise functionally associated with respective appliances connected to respective network segments, wherein one of the selective packet bridges is shown to shunt packet flows between two communication devices communicatively coupled to the network segment serviced by that bridge.

Turning now to FIG. 5, there is shown a network diagram of an exemplary cellular communication network according to embodiments including selective packet bridges integral or otherwise functionally associated with respective appliances connected to respective network segments, wherein one of the selective packet bridges is shown to shunt packet flows between two communication devices communicatively coupled to the network segment serviced by that bridge.

By analyzing the RTP traffic at the location of the MEC (aggregation points or adjacent to the eNB/Small-cell [eNB/ eNodeB—Evolved Node B—is the hardware that is connected to the mobile phone network that communicates directly wirelessly with mobile handsets (UEs), like a base transceiver station (BTS) in GSM networks]) unique information may be generated for analytics purposes in a strategic location in the network. This may include information such as latency, jitter, lost-packets and any additional information that may assist the operator, on a per cell/eNB/ aggregation-point level.

Figure 6:
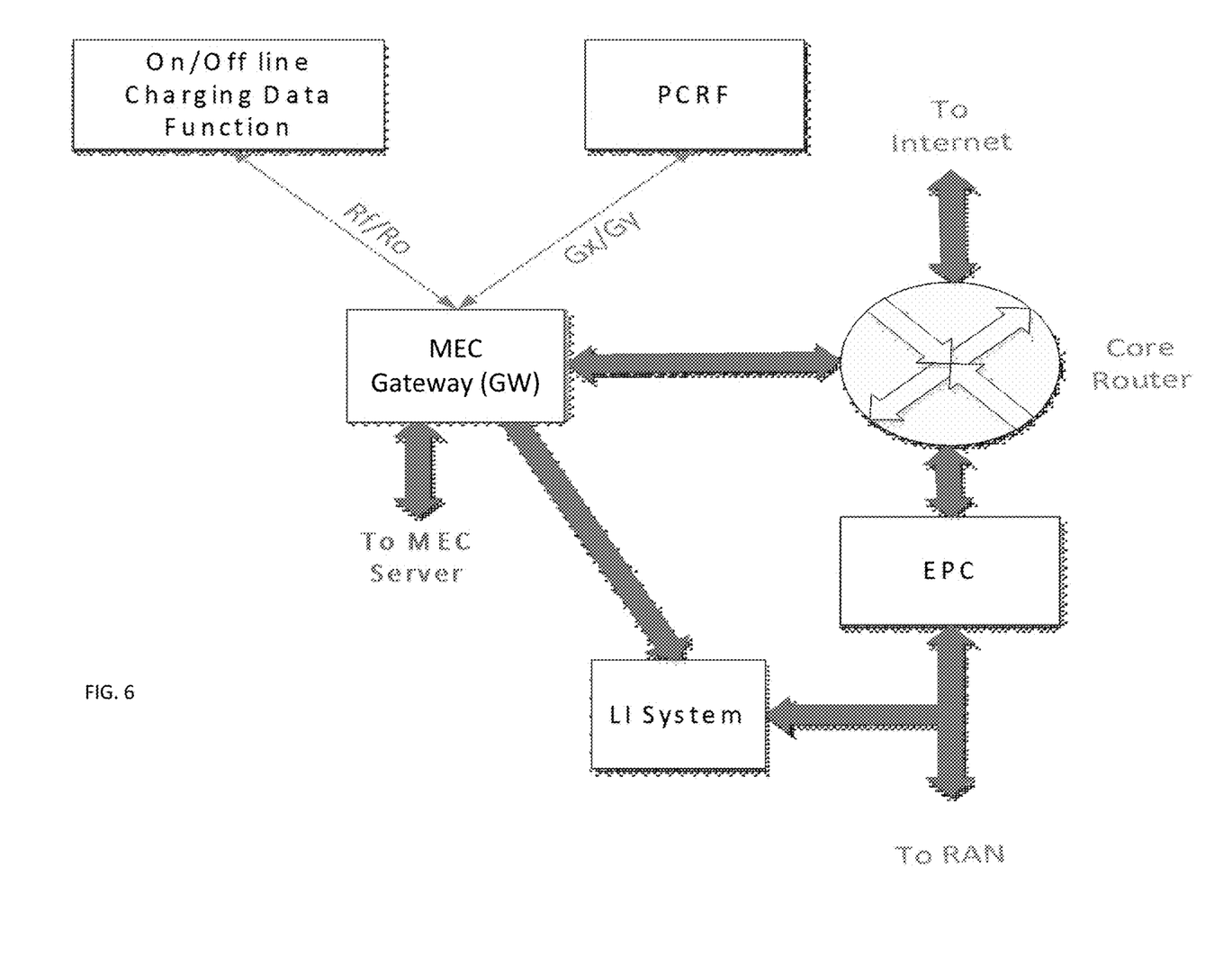
FIG. 6 illustrates a cellular network appliance arrangement including selective packet bridging appliances communicating with both network access segment equipment and network core equipment.

Turning now to FIG. 6, there is shown a cellular network appliance arrangement including selective packet bridging appliances communicating with both network access segment equipment and network core equipment.

In order to guarantee lawful interception of the locally routed packets the MEC server forwards a full copy of the locally routed packets including all headers towards an MEC GW located adjacent to the EPC that in-turn sends the full packets into the lawful interception system tap.

In the case of a mobility event the MEC server can detect the mobility event by analyzing the S1AP messages. In case this option is not available, the MEC server will detect the mobility through the RTP packets. In case one of the UEs is having a mobility event its GTP tunnel changes and thus the MEC will stop receiving packets on that RAB, the generated packets by this UE will flow towards the EPC and back to the other UE not through the MEC server. Upon detection of such an event, the MEC server will detect the RTP packets arriving from the direction of the EPC and will immediately stop local routing and all packets will be routed towards the EPC.

According to some embodiments of the present invention, there may be provided a communication network comprising: at least one network access segment including one or more network access points; and a selective packet bridge appliance integral or otherwise functionally associated with the at least one network access segment and adapted to selectively shunt packet flow between two or more mobile communication devices communicatively coupled to the at least one network access segment through access points of the at least one network segment, wherein a packet is selected for shunting at least partially based on an intended destination of the packet and at least partially based on a payload type of the packets.

According to some embodiments, the selective packet bridge appliance of the communication network may include a packet inspector to inspect packets on an uplink of the at least one network access segment generated by communication devices communicatively coupled to the at least one network access segment through one of the one or more access points.

According to some embodiments, the packet inspector of the communication network may be further adapted to inspect packets on a downlink of the at least one network access segment and designated for a communication device communicatively coupled to the at least one network access segment through one of the one or more access points. According to some embodiments, the packet inspector may be further adapted to determine a packet parameter including one or more of: (a) a packet payload type; (b) a packet source designator, (c) a packet destination designator, and (d) a packet quality of service requirement.

According to some embodiments, the selective packet bridging appliance of the communication network may further include packet selection logic circuits for selecting one or more packets from an uplink of the at least one network access segment to shunt to a downlink of the at least one network access segment. According to some embodiments, the packet selection logic circuits may be further adapted to determine that an uplink packet flow is intended for a communication device communicatively coupled to said at least one network access segment by: (a) comparing a packet destination designator against a table correlating destination designators to network access segments; or (b) detecting that a packet flow on the uplink corresponds to a packet flow on the downlink.

According to some embodiments, the packet selection logic circuits of the communication network may be further adapted to select real-time transport protocol packet flows for shunting to a downlink.

According to some embodiments, the selective packet bridging appliance of the communication network may further include a packet injector adapted to inject a shunted packet into a downlink of the at least one network access segment. According to some embodiments, shunting packet flow may include allowing the shunted packet or a copy of the shunted packet to reach a core of the network and then dropping the packet before it reaches an intended destination.

According to some embodiments of the present invention, there may be provided a method of operating a communication network comprising: selectively shunting packet flow between two or more mobile communication devices communicatively coupled to the same at least one network access segment through access points of the at least one network segment, wherein selection for packet shunting is at least partially based on an intended destination of the packet and at least partially based on a payload type of the packets.

According to some embodiments, shunting may include inspecting packets on an uplink of the at least one network access segment generated by communication devices communicatively coupled to the at least one network access segment through one of the one or more access points. According to some embodiments, shunting may include inspecting packets on a downlink of the at least one network access segment.

According to some embodiments, inspecting may determine a packet parameter including one or more of: (a) a packet payload type; (b) a packet source designator, (c) a packet destination designator, and (d) a packet quality of service requirement.

According to some embodiments, shunting may include copying RTP packets from an uplink of the at least one network access segment to a downlink of the at least one network access segment.

According to some embodiments, packet selection logic may include determining that an uplink packet flow is intended for a communication device communicatively coupled to the at least one network access segment by: (a) comparing a packet destination designator against a table correlating destination designators to network access segments; or (b) detecting that a packet flow on the uplink corresponds to a packet flow on the downlink.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A communication network comprising:
   at least one network access segment including one or more network access points; and
   a selective packet bridge appliance integral with said at least one network access segment and adapted to selectively shunt packet flow between two or more mobile communication devices communicatively coupled to said at least one network access segment through access points of said at least one network segment, such that packets are selected for shunting at said at least one network access segment based on an intended destination and payload of the packets, and the packets are shunted by injecting data from selected upstream packets into a downstream data link of said at least one network access segment while allowing data from the shunted packet to continue from said at least one network access segment to a core of said network.

2. The communication network according to claim 1, wherein said selective packet bridge appliance includes a packet inspector to inspect packets on an uplink of said at least one network access segment generated by communication devices communicatively coupled to said at least one network access segment through one of the one or more access points.

3. The communication network according to claim 2, wherein said packet inspector is further adapted to inspect packets on a downlink of said at least one network access segment and designated for a communication device communicatively coupled to the at least one network access segment through one of the one or more access points.

4. The communication network according to claim 2, wherein said packet inspector is further adapted to determine a packet parameter including one or more of: (a) a packet payload type; (b) a packet source designator, (c) a packet destination designator, and (d) a packet quality of service requirement.

5. The communication network according to claim 4, wherein said selective packet bridging appliance further includes packet selection logic circuits for selecting one or more packets from an uplink of the at least one network access segment to shunt to a downlink of the at least one network access segment.

6. The communication network according to claim 5, wherein said packet selection logic circuits are adapted to determine that an uplink packet flow is intended for a communication device communicatively coupled to said at least one network access segment by: (a) comparing a packet destination designator against a table correlating destination designators to network access segments; or (b) detecting that a packet flow on the uplink corresponds to a packet flow on the downlink.

7. The communication network according to claim 6, wherein said packet selection logic circuits are adapted to select real-time transport protocol packet flows for shunting to a downlink.

8. A method of operating a communication network comprising:
   selectively shunting packet flow between two or more mobile communication devices communicatively coupled to a common network access segment through access points of the common network segment, wherein selection for packet shunting is executed at said at least one network access segment based on a destination of the packet and on a payload type of the packet, wherein shunting includes injecting data from a selected upstream packet into a downstream data link of said at least one network access segment while allowing data from the shunted packet to continue from said at least one network access segment to a core of said network.

9. The method according to claim 8, wherein shunting includes inspecting packets on an uplink of the at least one network access segment generated by communication devices communicatively coupled to the at least one network access segment through one of the one or more access points.

10. The method according to claim 9, wherein shunting includes inspecting packets on a downlink of the at least one network access segment.

11. The method according to claim 10, wherein inspecting determines a packet parameter including one or more of: (a) a packet payload type; (b) a packet source designator, (c) a packet destination designator, and (d) a packet quality of service requirement.

12. The method according to claim 11, wherein shunting include copying RTP packets from an uplink of the at least one network access segment to a downlink of the at least one network access segment.

13. The method according to claim 11, wherein packet selection logic includes determining that an uplink packet flow is intended for a communication device communicatively coupled to the at least one network access segment by: (a) comparing a packet destination designator against a table correlating destination designators to network access segments; or (b) detecting that a packet flow on the uplink corresponds to a packet flow on the downlink.

* * * * *